United States Patent
Terrell, II

(10) Patent No.: US 8,868,447 B1
(45) Date of Patent: Oct. 21, 2014

(54) SENSOR AND CONTROL NODE PUBLISHING AND SUBSCRIPTION SYSTEM

(75) Inventor: James Richard Terrell, II, Charlotte, NC (US)

(73) Assignee: Charlotte Intellectual Properties, LLC, Charlotte, NC (US)

( * ) Notice: Subject to any disclaimer, the term of this patent is extended or adjusted under 35 U.S.C. 154(b) by 915 days.

(21) Appl. No.: 12/464,068

(22) Filed: May 11, 2009

Related U.S. Application Data

(60) Provisional application No. 61/052,188, filed on May 10, 2008.

(51) Int. Cl.
*G06Q 30/00* (2012.01)

(52) U.S. Cl.
USPC ........................................ 705/14.73; 705/14.4

(58) Field of Classification Search
CPC ....................................................... G06Q 40/00
USPC ....................................................... 705/36, 14
See application file for complete search history.

(56) References Cited

U.S. PATENT DOCUMENTS

| | | | |
|---|---|---|---|
| 7,020,701 B1 * | 3/2006 | Gelvin et al. | 709/224 |
| 7,409,402 B1 * | 8/2008 | Chan et al. | 1/1 |
| 7,412,899 B2 * | 8/2008 | Mian et al. | 73/802 |
| 2006/0153154 A1 * | 7/2006 | Yoon et al. | 370/338 |
| 2007/0016476 A1 * | 1/2007 | Hoffberg et al. | 705/14 |
| 2009/0195401 A1 * | 8/2009 | Maroney et al. | 340/686.6 |

* cited by examiner

*Primary Examiner* — Eric T Wong
*Assistant Examiner* — John Anderson
(74) *Attorney, Agent, or Firm* — Tillman Wright, PLLC; James D. Wright; David R. Higgins

(57) ABSTRACT

A system aggregates data collected from independently owned and controlled networked sensors and controls into content channels. The system allows for anonymous subscription to content channels and sensor data by channel client, other sensor owners, and service providers who bid for the right to advertise services to content channel clients based on sensor data patterns for which the service providers can provide particular insight.

16 Claims, 3 Drawing Sheets

SENSOR AND CONTROL NODE PUBLISHING AND SUBSCRIPTION SYSTEM

CROSS REFERENCE TO RELATED APPLICATIONS

The present application is a U.S. nonprovisional patent application of, and claims priority under 35 U.S.C. §119(e) to, provisional U.S. patent application Ser. No. 61/052,188, filed May 10, 2008. The entirety of such patent application is incorporated herein by reference.

BACKGROUND OF THE PRESENT INVENTION

1. Field of the Present Invention

The present invention relates generally to the aggregation and publication of sensor node data and control node data, and, in particular, to subscription to content channels and sensor data by channel client, other sensor owners, and service providers who bid for the right to advertise services to content channel clients based on sensor data patterns for which the service providers can provide particular insight.

2. Background

Input devices (sensors, etc.) and output devices (control outputs, etc.) are often networked to enable remote monitoring and management operations, creating a network of sensor/control nodes.

It is common for access to networked sensor/control nodes to be carefully limited to only the owner of the sensor/control devices. For example, a network of sensors and controls for a home automation system might be purchased and installed by a consumer, and then managed privately by the consumer. A commercial entity, such as a manufacturing company, might install a similar network of sensors and controls in order to automate a manufacturing process. After installation, the sensor/control nodes are managed privately and directly by the company and its employees. In both cases, security safeguards are put in place to make sure that access to the sensor/control network is limited to authorized users.

In another common model, ownership and management of a sensor/control network may be partially or completely delegated to a third-party service provider. An example would be a security services firm which installs and maintains a network of cameras, sensors, alarms and so forth in order to protect the premises of their customers. In this case, the sensor/control network nodes could be owned by either the customer or the security company and management might be similarly split between the customer and the security company which also provides monitoring and management services which are tied to the sensor/control nodes.

Often, there may be a high degree of specialization required to delegate control of a sensor/control network to a service provider. Entire industries are created to manage one particular type of sensor/control network (security, for example) and single-provider management approaches are common. For example, it would be unlikely that a consumer would attempt to engage more than one security company to manage different parts of their property, even though one security service provider could be more adept at one type of security, say outdoors, while another might be better at managing indoor security or vehicle security.

Another challenge is that as sensor and control networks become cheaper and easier to install, the number and types of sensor/control devices increases to the point where fine-grained monitoring and management of a customers sensor/control network would be most efficiently accomplished by using multiple service providers, each of which must be given access to different portions of the same sensor network in a controlled and secure fashion. Since each connection between a sensor/control device and its related service provider may require customer interaction, the overhead of maintaining service provider relationships may quickly overwhelm the customer, leading to higher cost and less efficiency in the management of their sensor/control network.

Also, as sensor/control devices become increasingly cheaper and more numerous, device owners may discover that the sensor data and control points on their network have value to other network owners or to service providers. For example, temperature, rainfall, video surveillance, or other environmental monitoring data might have value to an entire geographical community, beyond the value to the individual device owner. Furthermore, it is well known that the value of an aggregated sensor/control network, shared amongst many owners, can be far higher than the sum of its individual sensor/control nodes. For example, a network of traffic cameras is far more useful than a single camera. So, it would make sense that sensor/control network owners will increasingly wish to offer subscription to their sensor/control network data and controls in a fine-grained, low-overhead, secure and controlled manner.

However, at present, monolithic service provider approaches are not amenable to this activity, as each provider tends to address only one class of sensor and control data (security, auto diagnostics, etc.) and generally limits access to the sensor and control networks to in-house experts. In addition, each service provider typically requires a significant customer commitment before offering service. For example, a customer of a security firm might pay a monthly fee for a set collection of services applied to a set collection of sensors and controls, and might also be required to sign a 12 month, or longer contract before receiving service. Changing the service arrangement requires a change in contract. And the security firm will not be able to manage the rest of the customer's sensor/control network, such as the lawn maintenance sensors and controls, or the home automation controls (lights, environmental, coffeepot timers, etc.)

In another scenario, an automotive diagnostic and management system might be attached to a network by means of a mobile radio network, linking the vehicle to the manufacturer's monitoring facilities. Again, in this case, any error or diagnostic condition will be available to and serviced by only the manufacturer's chosen representatives, limiting the ability of the vehicle owner to shop for competitive auto service based on the diagnostic sensor data.

Recently, the rise in the popularity of the Internet and its various forms of data publishing have enabled access to sensor data of all kinds, often in real-time. Web Cams are one example. Also, the dissemination of documentation for various sensors and sensor data values is becoming more widely available. For example, the trouble codes reported by most makes of automobiles are now widely available in web page form. Finally, networked interfaces are becoming more common for remote control and management of control outputs. An example would be remote control of a home's lights or environmental systems. However, although this increase in availability of information and control has made it easier for an individual or organization to understand and collect relevant sensor information and, in some cases, to control it, the complexity and volume of this data has only increased and will continue to increase as more sensor and control devices become networked.

Thus, a need exists for a system that makes possible the fine-grained and efficient outsourcing of sensor/control network device management and control, as well as providing for the efficient publishing of and subscription to sensor/ control network data and control amongst numerous sensor/ control network owners, service providers, and other parties. With such a system in place, users no longer need to perform tedious searches for relevant information, or manage numerous ongoing business relationships with service providers. Instead, the network of service providers collaborates to select and interpret sensor data and manage control endpoints, each hewing to their particular area of expertise, and each competing with others and paying for the right to interact with system users to provide services particular to their immediate needs. The system can be contrasted with the popular web search model, where users search for relevant information and services. In this system, information and services search for the user.

SUMMARY OF THE PRESENT INVENTION

Broadly defined, the present invention according to one aspect is a method of aggregating and publishing sensor node data, including: receiving sensor data from each of a first plurality of sensor nodes; developing a plurality of content channels, each created by one or more channel developers, and aggregating sensor data from a second plurality of sensor nodes, the second plurality of sensor nodes being a subset of the first plurality of sensor nodes; publishing the content channels such that they can be accessed by one or more channel clients over one or more data communications networks; tracking a plurality of content channel stakeholders for each of the content channels; enabling channel clients to configure content channels to trigger on patterns of data, meeting predetermined criteria, from the aggregated sensor data and to generate events descriptive of the data patterns; enabling one or more service providers to configure content channels to trigger on the patterns of data, meeting the predetermined criteria, from the aggregated sensor data, and to associate advertising content with the data patterns; notifying channel clients whenever sensor data patterns that meet the predetermined criteria are detected; attaching, to the notification, the advertising content, from the one or more service providers, that is associated with the sensor data patterns that meet the predetermined criteria; identifying and tracking the viewing of advertising content; identifying and tracking any purchasing or other business-related actions of channel clients based on the display of the advertising content from the one or more service providers; accounting for service provider fees related to the display of the advertising content; accounting for business transactions resulting from the display of the advertising content; and distributing accumulated fees to one or more of the content channel stakeholders.

In a feature of this aspect, receiving sensor data from each of a first plurality of sensor nodes includes receiving sensor data from both physical sensor nodes and virtual sensor nodes, and the method further includes combining data from the virtual sensor nodes with data from the physical sensor nodes into a single content channel.

In another feature of this aspect, the method further includes: integrating one or more control nodes, owned or controlled by one or more owners, into a content channel; and allowing the channel clients to selectively give access to content channel output controls, controlled by the channel clients, to service providers. In a further feature, integrating one or more control nodes includes integrating both physical data output control nodes and virtual data output control nodes.

In another feature of this aspect, the method further includes: extracting data from individual sensor nodes; and recombining the extracted data into a content channel by means of a programmable script or filter. In a further feature, the method further includes developing the programmable script or filter in a computing programming language. In a still further feature, the computing programming language includes at least one of Java, PHP, Perl, Javascript, Visual BASIC, .NET, C, C++, XSLT, and CSS.

In another feature of this aspect, tracking a plurality of content channel stakeholders for each of the content channels includes tracking entities responsible for creating, operating, and publicizing the content channel, including one or more of the channel developers, the owners, manufacturers, and retailers of the sensor nodes aggregated by the content channel, the operators of the content manager, owners of data communications networks, and entities who control the physical or logical locations of sensor and control nodes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further aspects, features, embodiments, and advantages of the present invention will become apparent from the following detailed description with reference to the drawings, wherein.

DETAILED DESCRIPTION OF THE PREFERRED EMBODIMENTS

Figure 1:
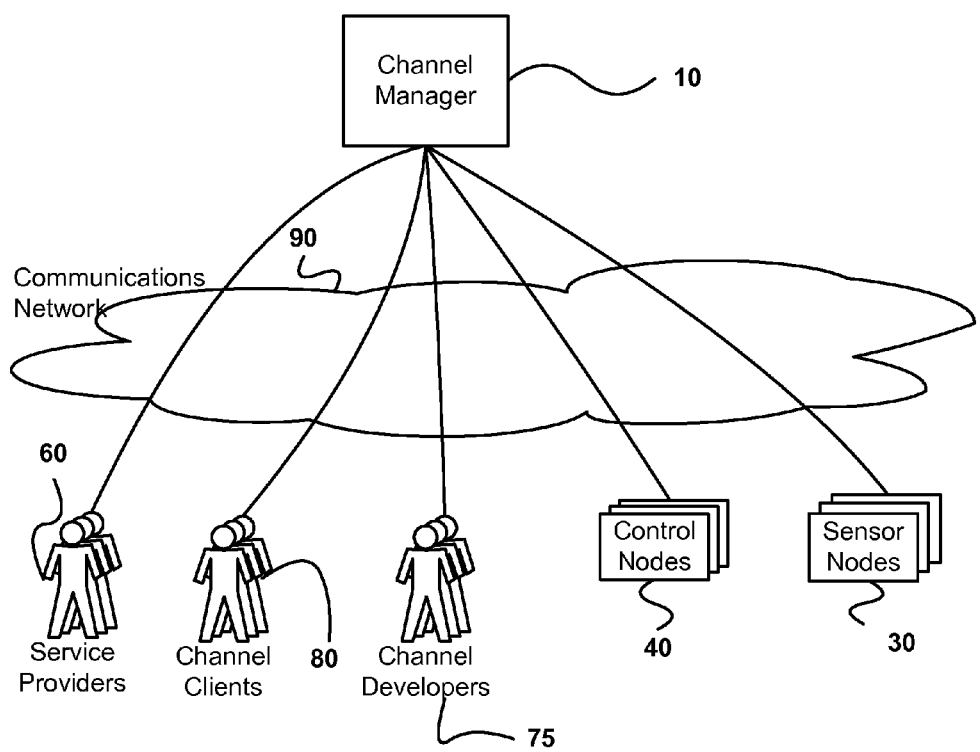
FIG. 1 is a simplified block diagram of a system, in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is it to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a simplified block diagram of a system in accordance with a preferred embodiment of the present invention. As shown therein, the system includes a channel manager 10, a communications network 90, a plurality of sensor nodes 30 and a plurality of control nodes 40, with a plurality of users 25,60,75,80 of different types interacting with the channel manager 10. Each of these elements will be described in greater detail hereinbelow.

Channel Manager

The channel manager 10 is the processing and coordination hub of the system. The channel manager 10 is preferably implemented as one or more data processing servers which connect to external entities via the data communications network 90. A common example of such a server would be an Internet web server.

Communications Network

The communications network 90 may comprise any network topology capable of transmitting and receiving data between multiple network endpoints. Examples of preferred communications network include the Internet, 802.11 wireless local area networks, mobile telephony wireless wide area networks, short-hop data networks such as 802.14, and others, and any combination thereof.

Sensor Nodes

The system also includes sensor nodes 30 which act as system inputs. Any device which can measure an input and transmit the input over the communications network is considered as a sensor node 30. Some sensor nodes 30 may embody physical input devices, including, but not limited to:
Environmental: Temperature, humidity, wind speed and direction, lightning proximity, water level, and so forth;
Security: door or window ajar, glass breakage, security video and audio, movement, IR detection, and so on; and
Diagnostic: automotive trouble codes and diagnostic data, appliance performance and diagnostic outputs, and so forth.

Other sensor nodes 30 may embody "virtual" or logical input devices, where no physical input is measured, but, instead, an existing data stream is adapted for use as an input. Some forms of data streams that could be used as virtual sensor nodes 30 include, but are not limited to:
Email communications;
Syndicated network content feeds, such as RSS or ATOM feeds;
Any Internet web pages accessible via the HTTP protocol that contains dynamic content;
Internet mailing lists; and
Network diagnostics, such as that returned by the SNMP protocol.

By way of these examples it can be seen that any data object can be treated as a virtual sensor node 30. Accordingly, this description generally does not distinguish between sensor nodes 30 which interface to physical inputs and "virtual" sensor nodes 30 which are implemented as data or content bridges.

Sensor data can be of any format and is categorized to allow for the easy interchange of sensor nodes 30 within content channels 70. For example, a temperature sensor node might be defined as returning a numeric temperature value using the Fahrenheit temperature scale, and also as having a geospatial location. A physical temperature sensor might be implemented as a transducer input located in a building or at an airport. The temperature value might be the actual air temperature at a specified geospatial location. Another temperature sensor node 30 might be implemented "virtually" by retrieving data from a national weather service web site, or content feed. The reported temperature value and geospatial location would be the current values reported by the weather service. It can be seen that data from either sensor 30 would be interchangeable and that it is a significant feature of this system that physical sensor nodes 30 are not distinguished from, and can be used interchangeably with "virtual" sensor nodes 30.

Control Nodes

In a manner similar to sensor nodes 30, the system also contains control nodes 40 which act as system outputs. Any networked device which can control an output signal is considered to be capable of use as a control node 40. For example, a bridge to an X10 home control system might expose all of the outputs in its network as control nodes 40 Some control nodes 40 may embody physical output devices, including, but not limited to:

Security: alarms, lock and unlock control, warning lights, and so forth; and

Home control: lights, heating and air conditioning settings, water heater on or off, lawn sprinklers, music settings, audio alerts, video or photo displays, and so forth.

Other control nodes 40 may embody "virtual" or logical output devices, where no physical output is controlled, but, instead, any network data output interface can be adapted for use as a logical output. For example, sending a formatted email to a certain email address could be considered as an output node 40 which could be included in a content channel 70 as a signaling output node 40. Some common logical interfaces that could be used as virtual control nodes 40 include, but are not limited to:

Internet web pages that accept input via the HTTP POST, PUT, REST, SOAP, or other HTTP input interfaces. For example, the posting of data to an internet social networking site;

Creating and transmitting messages to content feeds such as RSS/ATOM or other syndicated feeds;

The generation and transmission of email messages;

The generation and transmission of Short Message Service messages to mobile telecommunication devices;

The generation and transmission of Multimedia Message Service messages to mobile telecommunication devices;

The generation and transmission of messages to Instant Messaging systems; and

The posting of digital photographic, video, or audio data to Internet media websites.

By way of these examples it can be seen that any networked data output interface can be treated as a virtual control node 40. Accordingly, this description generally does not distinguish between control nodes 40 which interface to physical outputs and "virtual" control nodes 40 which control logical data interfaces. It is a significant feature of this system that physical control nodes 40 are not distinguished from, and can be used interchangeably with "virtual" control nodes 40.

Node Owners

Sensor and control nodes 30,40 may be owned or controlled by one or more node owners 25 who allow the nodes to be accessed in return for advertising revenue generated by the node data or other consideration. There may also be nodes 30,40 for which no owner is identified.

Node Database

Figure 2:
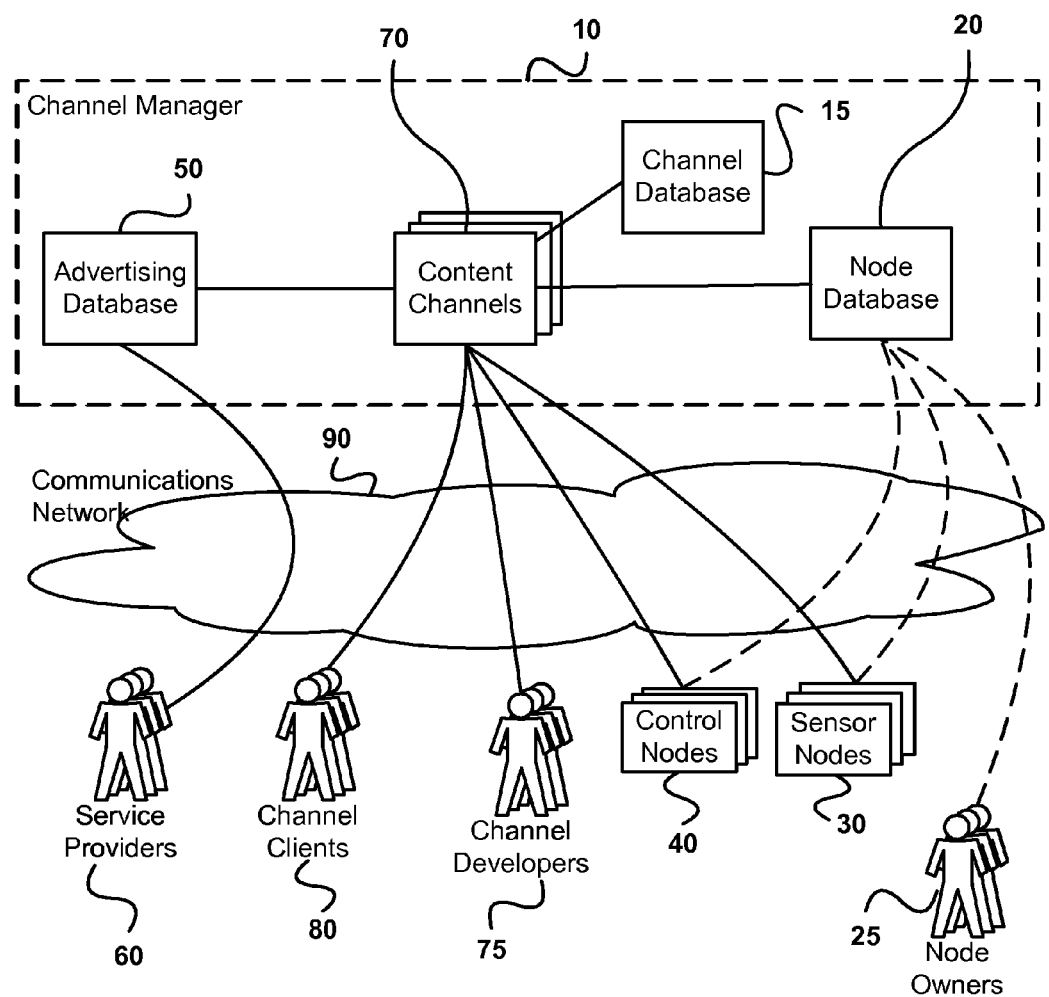
FIG. 2 is a block diagram of a system, showing additional details of the system of FIG. 1.

Referring now to FIG. 2, which extends FIG. 1 with additional details of the channel manager's 10 internal structure, a node database 20 is incorporated into the channel manager 10 and is used to store information about nodes 30,40 and their owners 25, as represented by the dashed lines.

Nodes 30,40 may be classified by type, independent of implementation or specific deployment. The node database 20 is where the specific details of node configuration and deployment are stored. For example, a temperature sensor node 30 may have several configuration options that might be common to every type of temperature sensor, in particular the temperature scale in use, as well as geospatial location. However, there may be specific attributes for a particular temperature sensor node that can assist in the correct usage of the sensor data. For example, it may be relevant to know if the reported temperature is an air temperature, or water temperature, or the temperature being reported by an industrial process, or the interior of a home appliance, such as a freezer. The node database 20 stores these and other attributes as defined by the node owner 25 for each sensor and control node 30,40.

Content Channels

Also illustrated in FIG. 2 is the content channel 70 element. Content channels 70, sometimes generally referred to hereinafter as "channels", are the basic information abstraction of the system. Channels 70 are preferably implemented as computer software or scripts running on the channel manager 10 server(s) and are accessed via common network communications protocols such as HTTP, or TCP/IP in the case of the Internet. A channel database 15 may be utilized to track channel 70 configurations settings, channel ownership information, and other channel metadata.

Content channels 70 aggregate event data from one or more sensor nodes 30, and format it for access by the channel clients 80. They also associate relevant control nodes 40 which may be used to respond to events coming in from the sensor nodes 30 referenced by the content channel 70. As an example, a lawn care channel 70 might be created that aggregated inputs from temperature, humidity, rainfall, and calendar sensor nodes 30. Furthermore, the channel 70 might also incorporate control nodes 40 for turning the lawn sprinklers on and off, or reprogramming the sprinkler system.

Channels 70 locate nodes 30,40 by referring to the node database 20 to access input and control interfaces that may be shared amongst multiple content channels 70 when it makes sense. For example, a sensor node 30 might be created that reports national weather service data. This node might then be referenced by any channel 70 that needs temperature, rainfall, weather alerts, or other weather-related data.

Content channels 70 also incorporate event generation or notification interfaces and have the ability to generate events based on data received from their aggregated sensor nodes 30. To extend the lawn care example, the channel 70 would have the ability to generate a warning or diagnostic event whenever a problem is detected, such as an extended drought, or the detection of low pressure in the sprinkling system water supply.

Although a content channel 70 might support a browsing or query interface, it might also operate in an autonomous mode where it converts incoming sensor data changes into control outputs with no external intervention. In this role, the content channel acts more as an automated control system, or data filter and may actually be treated in its own right as virtual sensor or control node 30,40, producing logical sensor node 30 events and exposing logical output node 40 interfaces that can be referenced by other content channels 70. This self-referential property of content channels 70 allows them to be arranged into arbitrarily complex relationships, while still allowing separation of function and complexity into smaller sub-channels.

Content channels 70 also incorporate a configuration capability that allows general-purpose channels 70 to be targeted to the specific needs of a particular application. Returning to the example of a national weather service sensor 30, such a sensor might be configurable so as to only generate events relevant to a particular geographical location. Or, the capability to enable, disable or filter classes of events might be made available, as in the case where only severe weather alerts are enabled, and all alerts of lower severity are filtered.

There may be many working copies of a content channel 70, each of which may be configured for a specific combination of channel client 80, nodes 30,40, and other configuration settings.

Channel Clients

Channel clients 80 subscribe to, and are the primary users of, the content channels 70. They may be persons viewing channel 70 data on a web page, or persons running channel 70 control panel software on a mobile phone, or another server or automated process that has been programmed to consume channel 70 input and respond programmatically by manipulating channel 70 outputs. Channel clients 80 use channels 70 by requesting instances of channels 70 from the channel manager 10. The clients 80 then configure the channel instances 70 to access sensor 30 and control nodes 40 that they wish to monitor or control, and by configuring whatever settings a particular type of channel 70 makes available. In this way content channels 70 are customizable to the specific deployment needs of channel clients 80.

Channel clients 80 derive value from the system by having related sensor and control node 30,40 data aggregated, filtered, and presented by channels 70 in a manner that is relevant to the task they wish to accomplish. This is as opposed to the alternative of having to track down and assemble relevant data inputs and control outputs on their own.

Channel clients 80 are also consumers of services related to content channel 70 notifications and events, and may pay for service providers 60, to address repair or maintenance issues detected by the content channels 70 to which they subscribe.

Channel Developers

Content channels 70 are created by one or more channel developers 75, sometimes generally referred to hereinafter as "developers", who develop the programmable scripts, filters and other computing mechanisms which unify the various sensor node 30 inputs, and control node 40 outputs, and advertising content into a content channel 70.

Channel developers 75 have an ownership stake in the channels they develop, and are identified and tracked in the channel database 15. The system takes account of channels 70 which have been developed or maintained by single or multiple channel developers 75, and also recognizes channels 70 that have been developed and maintained by the channel developer 75 community at large, and are not considered to be owned by any developer 75 or group of developers 75.

Service Providers and Advertising

A content channel 70 will also incorporate service advertising content and selection filters which are stored in an advertising database 50. Advertising content and filters are created by service providers 60 who offer services related in some way to content channels 70. A service provider 60 may be an individual, business, or other entity that has goods or services to offer in relation to one or more content channels 70. The channel manager 10 provides a networked interface whereby service providers 60 can add their advertising content to the advertising database 20.

In addition to pricing and product information, advertising content may contain matching patterns for sensor data, as well as programming scripts which can be applied dynamically to sensor data as it appears in a channel 70, in real time. Given that advertising content can be specifically tailored to individual sensor node events, it becomes possible for service providers 60 to optimize their advertising campaigns for the services for which they are most competent, and therefore, can be most efficient in providing.

As an example, consider an "Auto Maintenance" content channel 70 which monitors and filters sensor nodes 30 located in a vehicle, perhaps by attaching a wireless network interface to the vehicle's OBD-II diagnostic interface port. The channel client 80 allocates one "Auto Maintenance" content channel 70 from the channel manager 10 for each vehicle that they wish to have monitored. They then configure each automobile's channel 70, uniquely identifying the networked sensor interface attached to each vehicle's OBD-II port, and configuring the channel 70 to deliver the types and amounts of diagnostic information that they are interested in. As the vehicles are driven, sensor data is collected and filtered by the content channel 70, which is configured, in this example, by the channel user 80 to watch for maintenance events, such as the automobile exceeding a certain mileage, or an error code being reported by the automobile's on-board diagnostics.

When such an event occurs, any content channels 70 that include the sensor data would pass the new data through an advertisement selection filter from the advertising database 50. Since the advertising content in the database would be specific to the sensor 30 event data, the notification of the event to the client 80 would also contain advertising content relevant to the event, giving the user quick access to the information and to service provider(s) 60 who are prepared to diagnose, and repair the auto as necessary.

From the perspective of a service provider 60, the system makes it convenient to specify their preferred areas of expertise, in addition to pricing and product or business information. To extend the automotive maintenance example, a mechanic might create advertising filters specific to a certain brand of automobile for which they have special expertise, say "Audi". In addition, they might add even more specific advertising filters for model years or vehicle models which they know even more about, or prefer to work on for some other reason. For example, the mechanic might create a more specific advertising filter such as "2000-2004 Audi A6 and A8 models".

Furthermore, if the mechanic knew that a certain model of vehicle tended to have a particular failure, manifesting as an engine diagnostic code, after a certain age, he or she might create an even more restrictive filter that would watch for those failures. For example, a filter might be set up to look for "2000-2004 Audi A6 and A8 models showing engine diagnostic code EC, Low Catalytic Converter Efficiency". Having the expertise, and parts inventory, to solve that specific problem would allow the mechanic to advertise their services in conjunction with matching channel 70 events, possibly at a lower price point than their competitors, or with increased confidence of making a quick, profitable repair, while gaining maximum customer satisfaction.

It can be seen that this matching of advertising content to specific sensor event data patterns leads to more precise and efficient matching of service providers 60 and channel clients 80. It also leads to convenience on the part of the channel client 80 and service provider 60 as the burden of event detection, identification and interpretation is carried by the system.

Continuing with another example, consider the case of household appliance maintenance and repair. If all of a home's major appliances are networked with low-cost diagnostic sensors, it can easily be seen that individual appliance failures can be routed to a "Home Appliance" content channel 70. Home appliance service providers 60 best equipped to handle a particular failure will then add advertising content and filters that matches the repairs they are best qualified to address.

For example, a service provider 60 who specializes in the repair and maintenance of Maytag freezers might set up an advertising filter and corresponding content for content channel 70 events corresponding to "Maytag freezers, duty cycle >30% at air temperatures <90 degrees Fahrenheit". When the content channel 70 event occurs, the service provider's advertisement to offer maintenance is triggered and added to the content channel 70, whereupon the channel client 80 is able to see what the problem is, and has the option of contacting one or more of the advertised service providers 60 in order to have the problem corrected.

This fine-grained matching of sensor 30 events to service providers 60 directly enables "micro-service" interactions, where a service provider 60 located anywhere in the world is able to render expertise and advice to address a situation for which they are especially well suited. If a content channel 70 includes control nodes 40 then a service provider 60 may be able to offer remote diagnostic and repair activities, simply by being given access to the control nodes 40 for the device that is having a problem.

Although the examples given here are informative as to how the system might be implemented and deployed to address specific situations, they are not intended to limit the scope of the applications of this system. It can be readily seen that the described system can be used to map any pattern of sensor data to any combination of service providers and/or advertising content and that numerous system configurations may be deployed applying to various service provider 60 business models.

Revenue Distribution

In at least one embodiment, when a channel client 80 selects an advertisement or otherwise takes action to engage an advertised service provider 60, the service provider 60 pays a fee for that service.

Additionally, service providers 60 may pay promotional fees to have their advertisement delivered more prominently to a channel client 80 instead of the advertisements of other service providers 60 who provide the same or a similar service. Unlike the common web advertising model, where service providers 60 bid for screen space based on user's web search keywords, channel service providers 60 bid for ad placement based on content channel 70 node data which they can use to more precisely gauge the relative value of their services to a potential channel client 80, as well as the cost of providing the service. In this way, it can be expected that service providers 60 who have advantages in expertise or efficiency in providing a particular service will be able to pay more to advertise to channel clients 80 who are in need of that service and will also be able to advertise a lower service price, thus increasing the overall efficiency of service delivery from service provider 60 to channel client 80.

In order to promote the creation of new content channels 70 as well as the deployment and creation of shared sensor nodes 30 and shared control nodes 40, it is advantageous to pool and distribute advertising revenue amongst all of the stakeholders who contribute to the creation and deployment of a content channel 70.

Figure 3:
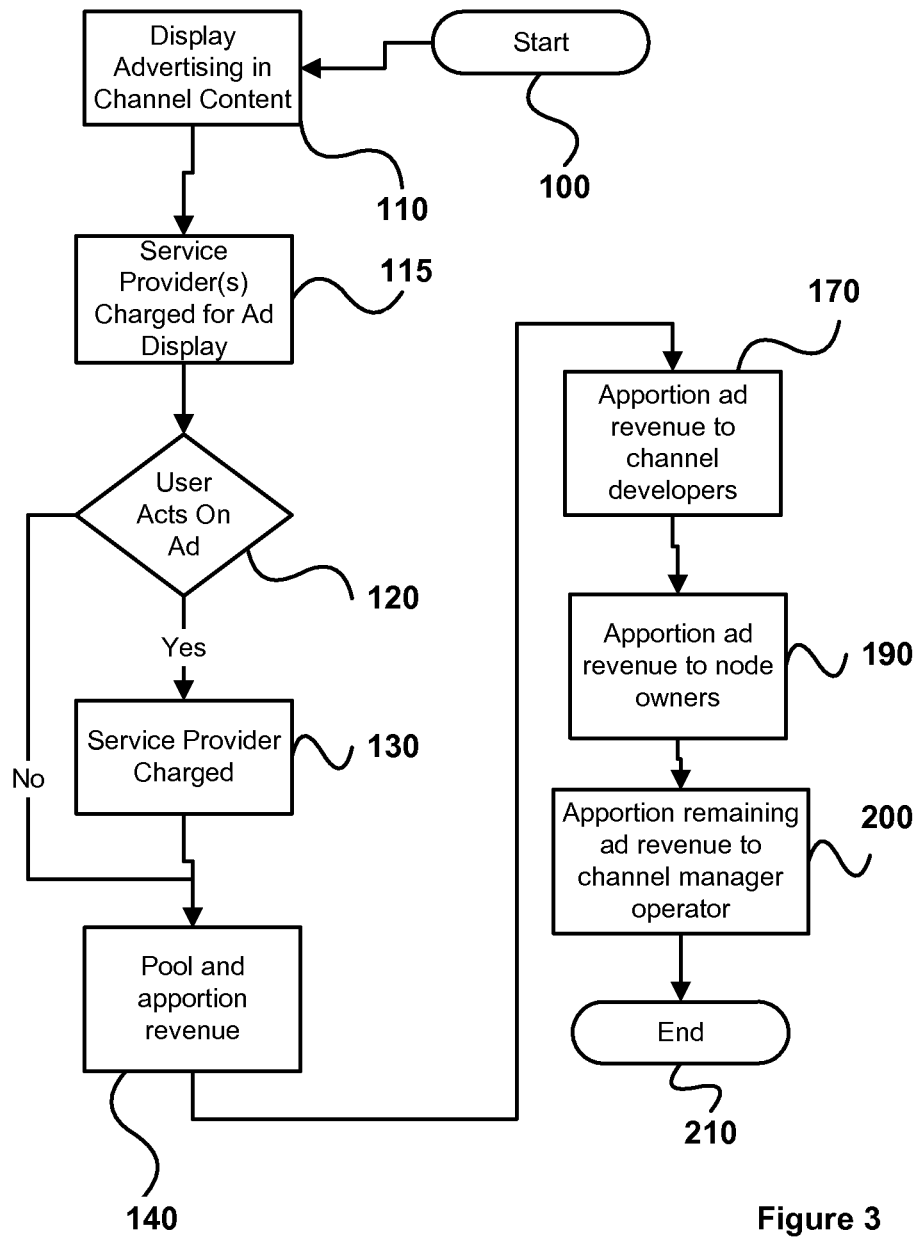
FIG. 3 is a flow chart showing the distribution of advertising revenue block diagram of a system which aggregates networked real and virtual sensors and controls into content channels, in accordance with a preferred embodiment of the present invention.

Referring now to FIG. 3, which is a flow chart showing an example of how advertising revenue could be distributed amongst stakeholders involved in creating and deploying a content channel 70, and where like steps in the process flow are numbered.

Starting at step 100, a content channel 70 includes advertising data and is presented to a channel client 80, in step 110, whereupon one or more service providers 60 are charged for the display of their service offers and other advertising content in step 115.

In step 120 the channel client 80 has the option to act upon the advertising data. If the channel client 80 does not act upon the advertisement(s), no additional advertising revenue is realized and the process continues with step 140.

If, however, the channel client 80 does act upon an advertisement, advertising revenue is realized from the selected service provider(s) 60 who provided the advertising content in step 130.

Continuing with step 140, advertising revenue from steps 115 and 130 is pooled and apportioned by referring to the node database 20 to determine node ownership, and the content channel 70, which triggered the transaction, to determine channel developer 75 involvement.

In step 170, advertising revenue is apportioned to the channel developers 75 who created the content channel 70, if any. Continuing with step 190, revenue is apportioned to the node owners 25, if there are any. Finally, the remaining ad revenue is apportioned to the channel manager owner in step 200 and the process completes with step 210.

The advertising revenue distribution process, as illustrated in FIG. 3, apportions advertising revenue to channel developers 75, node owners 25, and the operator of the channel manager system 10. This particular implementation is chosen merely to simplify the system illustration and it is to be understood that an actual system of this type may have fewer or more types of stakeholders, with the end goal being the multiplication of system stakeholders and the division of development effort and financial reward amongst all contributors to the system, leading to the rapid and decentralized development of new content channels, service advertisements, sensor and control node networks, and other system services and enhancements.

For example, the roles described here could be combined, as in the case where a single entity markets a product combining sensor and control nodes 30,40, creates one or more content channels 70 which access their nodes 30,40, and, finally provides service based on the content channels 70. In this case, the single entity occupies the roles of service provider 60, channel developer 75, and node owner 25.

In a like fashion, stakeholder roles could be divided more narrowly than as described in the foregoing examples. For example, the role of node owner 25 might be split amongst multiple stakeholders, each of whom has a part in the deployment of the nodes 30,40. Node stakeholders could include the product designer, manufacturer, retailer, marketer or publicist, as well as the entities who own or control the physical or virtual location of the nodes 30,40.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being provisionally limited only by the claims appended hereto and the equivalents thereof

What is claimed is:

1. A method of aggregating and publishing sensor node data, comprising:
receiving sensor data from each of a first plurality of sensor nodes;
developing a plurality of content channels, each created by one or more channel developers, and aggregating sensor data from a second plurality of sensor nodes, the second plurality of sensor nodes being a subset of the first plurality of sensor nodes;
publishing the content channels such that they can be accessed by one or more channel clients over one or more data communications networks;
tracking a plurality of content channel stakeholders for each of the content channels;
enabling channel clients to configure content channels to trigger on patterns of data, meeting predetermined criteria, from the aggregated sensor data and to generate events descriptive of the data patterns;
enabling one or more service providers to configure content channels to trigger on the patterns of data, meeting the predetermined criteria, from the aggregated sensor data, and to associate advertising content with the data patterns;
notifying channel clients whenever sensor data patterns that meet the predetermined criteria are detected;
attaching, to the notification, the advertising content, from the one or more service providers, that is associated with the sensor data patterns that meet the predetermined criteria;
identifying and tracking the viewing of advertising content;
identifying and tracking any purchasing or other business-related actions of channel clients based on the display of the advertising content from the one or more service providers;
accounting for service provider fees related to the display of the advertising content;
accounting for business transactions resulting from the display of the advertising content; and
distributing accumulated fees to one or more of the content channel stakeholders.

2. The method of claim 1, wherein receiving sensor data from each of a first plurality of sensor nodes includes receiving sensor data from both physical sensor nodes and virtual sensor nodes, the method further comprising:
combining data from the virtual sensor nodes with data from the physical sensor nodes into a single content channel.

3. The method of claim 1, further comprising:
integrating one or more control nodes, owned or controlled by one or more owners, into a content channel; and
allowing the channel clients to selectively give access to content channel output controls, controlled by the channel clients, to service providers.

4. The method of claim 3, wherein integrating one or more control nodes includes integrating both physical data output control nodes and virtual data output control nodes.

5. The method of claim 1, further comprising:
extracting data from individual sensor nodes; and
recombining the extracted data into a content channel by means of a programmable script or filter.

6. The method of claim 5, further comprising:
developing the programmable script or filter in a computing programming language.

7. The method of claim 6 wherein the computing programming language includes at least one of Java, PHP, Perl, Javascript, Visual BASIC, .NET, C, C++, XSLT, and CSS.

8. The method of claim 1, wherein tracking a plurality of content channel stakeholders for each of the content channels includes tracking entities responsible for creating, operating, and publicizing the content channel, including one or more of the channel developers, the owners, manufacturers, and retailers of the sensor nodes aggregated by the content channel, the operators of the content manager, owners of data communications networks, and entities who control the physical or logical locations of sensor and control nodes.

9. A method of aggregating and publishing sensor node data, comprising:
(a) receiving sensor data from each of a multitude of sensor nodes, wherein the sensor nodes in the multitude of sensor nodes are drawn from a plurality of separate, unrelated physical networks that are owned or controlled by different entities;
(b) developing a plurality of content channels, each created by one or more channel developers that are unrelated to and independent from the entities owning or controlling the physical networks, wherein:
(i) developing each of the plurality of content channels includes collecting sensor data from a respective plurality of sensor nodes of the multitude of sensor nodes
(ii) the respective plurality of sensor nodes from which each content channel is developed is a respective subset of the first plurality of sensor nodes, and
(ii) collecting the sensor data includes aggregating different types of sensor data and transforming the data into higher order data;
(c) publishing the content channels such that they can be accessed by one or more channel clients over one or more data communications networks, wherein each channel client is unrelated to and independent from the channel developer by whom the respective content channel was created;
(d) tracking a plurality of content channel stakeholders for each of the content channels;
(e) enabling channel clients to configure content channels to trigger on patterns of channel data, meeting predetermined criteria, from the aggregated channel data and to generate events descriptive of the data patterns;
(f) enabling one or more service providers to configure content channels to trigger on the patterns of data, meeting the predetermined criteria, from the aggregated sensor data, and to associate advertising content with the data patterns;
(g) notifying channel clients whenever sensor data patterns that meet the predetermined criteria are detected;
(h) attaching, to the notification, the advertising content, from the one or more service providers, that is associated with the sensor data patterns that meet the predetermined criteria;
(i) identifying and tracking the viewing of advertising content;
(j) identifying and tracking any purchasing or other business-related actions of channel clients based on the display of the advertising content from the one or more service providers;

(k) accounting for service provider fees related to the display of the advertising content;
(l) accounting for business transactions resulting from the display of the advertising content; and
(m) distributing accumulated fees to one or more of the content channel stakeholders.

10. The method of claim 9, wherein receiving sensor data from each of a multitude of sensor nodes includes receiving sensor data from both physical sensor nodes and virtual sensor nodes, and wherein the method further comprises combining data from the virtual sensor nodes with data from the physical sensor nodes into a single content channel.

11. The method of claim 9, further comprising:
integrating one or more control nodes, each owned or controlled by one or more owner that is independent from other control node owners, into a content channel; and
allowing the channel clients to selectively give access to content channel output controls, controlled by the channel clients, to service providers.

12. The method of claim 11, wherein integrating one or more control nodes includes integrating both physical data output control nodes and virtual data output control nodes.

13. The method of claim 9, further comprising:
extracting data from individual sensor nodes; and
recombining the extracted data into a content channel by means of a programmable script or filter.

14. The method of claim 13, further comprising:
developing the programmable script or filter in a computing programming language.

15. The method of claim 14 wherein the computing programming language includes at least one of Java, PHP, Perl, Javascript, Visual BASIC, .NET, C, C++, XSLT, and CSS.

16. The method of claim 9, wherein tracking a plurality of content channel stakeholders for each of the content channels includes tracking independent, unrelated commercial entities responsible for creating, operating, and publicizing the content channel, including one or more of the channel developers, the owners, manufacturers, and retailers of the sensor nodes aggregated by the content channel, the operators of the content manager, owners of data communications networks, and entities who control the physical or logical locations of sensor and control nodes.

\* \* \* \* \*